United States Patent [19]

Semenenko

[11] Patent Number: 5,702,034
[45] Date of Patent: Dec. 30, 1997

[54] MATERIAL HANDLING APPARATUS HAVING NESTABLE PALLETS

[75] Inventor: Ivan Semenenko, Moreton-In-Marsh, United Kingdom

[73] Assignee: Matcon Limited, Gloucestershire, United Kingdom

[21] Appl. No.: 500,065

[22] Filed: Jul. 10, 1995

[30] Foreign Application Priority Data

| Jul. 11, 1994 | [GB] | United Kingdom | 9413916 |
| Jul. 11, 1994 | [GB] | United Kingdom | 9413917 |
| Jul. 11, 1994 | [GB] | United Kingdom | 9413930 |

[51] Int. Cl.$^6$ ............................................ B67D 5/60
[52] U.S. Cl. .................................... 222/143; 222/185.1
[58] Field of Search .......................... 222/105, 185.1, 222/184, 143, 460; 206/505, 507, 509

[56] References Cited

U.S. PATENT DOCUMENTS

| 3,677,200 | 7/1972 | Coccagna et al. | 108/58 |
| 3,776,435 | 12/1973 | Smith | 222/566 |
| 4,382,724 | 5/1983 | Green | 406/130 |
| 4,398,653 | 8/1983 | Daloisio | 222/143 X |
| 4,660,733 | 4/1987 | Snyder et al. | 220/69 |
| 4,879,956 | 11/1989 | Shuert | 108/53.3 |
| 5,361,906 | 11/1994 | Sterett | 206/509 |
| 5,375,741 | 12/1994 | Harris | 222/105 |
| 5,402,915 | 4/1995 | Hogan | 111/460 X |

FOREIGN PATENT DOCUMENTS

| 0 006 078 | 12/1979 | European Pat. Off. . |
| 0 491 194 | 6/1992 | European Pat. Off. . |
| 1348780 | 12/1963 | France . |
| 3147283 | 6/1983 | Germany . |
| 1006300 | 9/1965 | United Kingdom . |
| 1100608 | 1/1968 | United Kingdom . |
| 1131113 | 10/1968 | United Kingdom . |
| 121407 | 11/1970 | United Kingdom . |
| 2096977 | 10/1982 | United Kingdom . |
| 2112742 | 7/1983 | United Kingdom . |

*Primary Examiner*—Gregory L. Huson
*Attorney, Agent, or Firm*—Shapiro and Shapiro

[57] ABSTRACT

Material handling apparatus shown is a pallet made in one piece from plastic material, having a surface in the form of a ring for supporting a container (not shown), the pallet is arranged in use to provide for discharge of material from a container of flowable (particulate) material, and for stacking and nesting with another similar pallet. The ring is a clamp ring which receives a similar ring of a container which rings can be clamped together by a suitable device to provide a unitary arrangement so that the pallet, or base, and the container can be filled and transported in one location, and discharged at a discharge station. The pallet thus includes the discharge means comprising a conical discharge outlet with a cone valve which can be operated with total containment at a discharge station by use of suitable valves.

11 Claims, 6 Drawing Sheets

MATERIAL HANDLING APPARATUS HAVING NESTABLE PALLETS

BACKGROUND OF THE INVENTION

The invention relates to a material handling apparatus, such as a pallet, particularly to a pallet for transporting containers for flowable material such as flexi-bags, flexi-bins, IBC's and the like.

In known transport of such containers, there is no provision for containment seals on discharge as the pallets which are used are not suitable for this, and usually are not cost-effective as they occupy a great volume of space. They are thus as expensive to transport when not in use as when they are in use.

Such apparatus is often used for the handling, transfer, storage and transport of flowable particulate material such as pellets, tablets, powder, grains and the like bulk particulate material.

If the material is transported from a filling station to a point of use or discharge station, it is often necessary to return the containers empty to the filling station. However, return of the empty container is often as expensive as transporting them when full.

These materials may also be environmentally hazardous, such as for example pharmaceuticals. Some regulations, for example maritime regulations, do not permit transport of such materials in other than rigid containers. Moreover, such containers must be smooth on the inside, for ease of cleaning, and must be capable of being emptied, usually with total containment of the material so that the surrounding environment is not contaminated. Containers for such material usually are formed from seamless steel or plastic, with a totally smooth interior surface, and have a square body with a round outlet which has its own outlet valve, usually a cone valve.

SUMMARY OF THE INVENTION

It is an object of this invention to seek to mitigate these disadvantages.

According to the invention there is provided a material handling apparatus comprising a surface for supporting a container, means arranged in use to provide for discharge of material from the container, and means for stacking and nesting with another similar apparatus.

The apparatus may suitably comprise a pallet moulded in one piece from plastic.

The pallet may have a base which can accept standard forks of say a fork-lift machine, for filling a container on the pallet, and wider channels for accepting wide forks at a point of use or discharge station.

A standard fork, for example a Euro-pallet form, can be inserted into the pallet from any one of four directions, providing universality of use in a Euro-fork mode. For extra wide forks at a point of use or discharge (of material from a container on the pallet) there may be channels and suitably guides, so that a single pallet can be used for filling for point-of-use or discharge, so there is a universality of applications provided by a pallet embodying the invention.

The means for providing discharge may be a substantially conical part of the pallet including a valve, suitably a cone valve, or may be a central orifice for receiving a container with an outlet including a valve, again suitably a cone valve.

The pallet may have an outer surface which is inclined inwardly (towards the central axis of the pallet) and the surface may include means in the form of a rebate or step, suitably of L-shape, for receiving a complementary shaped foot of an identical pallet. Pallets embodying the invention can thus be built up into a nested stack with feet of a successive pallet received in respective rebates of a preceding one, the conical pan of a succeeding pallet being nested in the conical pan of an immediately preceding pallet in the stack, as considered from the bottom, in use, of the stack.

The apparatus may comprise a container and a pallet base, which are releasably interengageable, the arrangement being such that a combined container and pallet base, or separate containers and pallet bases are nestable with similar apparatus.

By arranging for at least one portion of the apparatus to be stackable with other such portions, it is possible to reduce the volume occupied by empty apparatus in relation to that occupied by full containers.

The pallet base may be adapted for receiving the container whilst permitting discharge of the contents thereof.

A 24% volume in space as compared with unstacked pallets can be achieved with this construction of pallet, or pallet base which makes it economical for return and re-use to point of filling. Moreover, as the pallet includes a conical valve, total containment discharge of flowable material is possible, using suitable lip seals. This is equally true where the discharge means preferably in an alternative embodiment, comprises a through orifice for receiving a valve outlet of a container, for example a conical valve outlet. Thus a pallet or pallet base (hereinafter referred to as a pallet) embodying the invention can be used to deliver a bulk material container directly to process, automatically, even for cohesive materials.

Material handling apparatus embodying the invention are hereinafter described, by way of example, with reference to the accompanying drawings.

DESCRIPTION OF THE PREFERRED EMBODIMENTS

Referring to the drawings, the material handling apparatus shown in FIGS. 1 to 4 is a pallet 1 shown made in one piece from plastic material, having a surface in the form of a ring 2 for supporting a container (not shown), a means 3 of the pallet arranged in use to provide for discharge of material from a container of flowable (particulate) material, and means 4 for stacking and nesting with another similar pallet.

The ring 2 is a clamp ring which receives a similar ring of a container, which rings can be clamped together by suitable means to provide a unitary arrangement so that the pallet 1, or base, and the container can be filled and transported in one location, and discharged at a discharge station. The pallet 1 thus includes the discharge means 3 comprising a conical discharge outlet 5 with a cone valve (indicated diagramatically in FIG. 2) which can be operated with total containment at a discharge station by use of suitable valves.

Figures 1, 2, 3, 4:
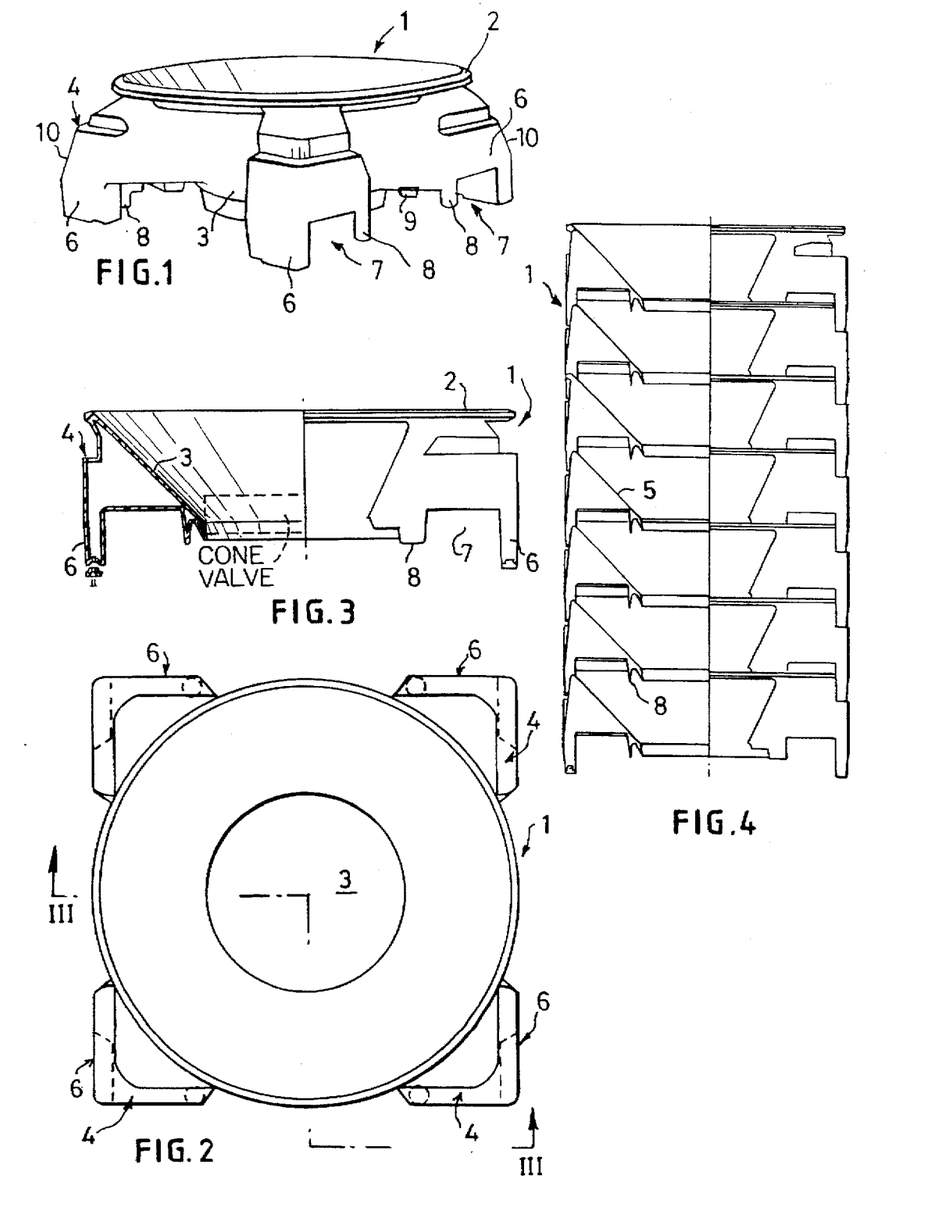
FIG. 1 shows a perspective view of a pallet according to the invention.
FIG. 2 shows a plan view of the pallet of FIG. 1.
FIG. 3 shows a sectional view on the line III—III of FIG. 2.
FIG. 4 shows a stack of nested pallets of the kind shown in FIGS. 1 to 3.

The pallet 1 has four legs 6, each with a gap or rebate 7 for accepting standard forks such as standard Euro forks. Between the legs there is a gap for a wider fork, for use at point of use or discharge. The base of the pallet between the legs, which is an inner part of each leg, has a local surface 8 which extends into the body of the pallet only a short way and this surface is about 100 mm from the free end of the legs 6 and is picked up on a fork cover plate of a standard fork for filling and moving.

There is also an inner guide 9 which depends from an inner edge of a leg 6 and which acts as an inner guide for special wide forks and as an outer guide for standard or Euro forks. The legs 6 are at four nodes or lobes of the pallet, and have an inwardly tapered outer surface 10 which is inclined up to the bearing surface 2. There is a rebate or ledge 4 on each leg, which itself is of L-shape in plan, so that when an L-shaped foot of a similar pallet is set down on the rebate, the pallets 1 are stacked in a stable, vertical array as the pallets cannot move in an X-Y axis, or rotate, the legs 6 of the successively upper pallet 1 passing outside the bearing surface or ring 2 and the inner conical valve 3 nesting in the valve of the immediately lower or preceding pallet in the stack. Thus there is a stacked, nested array of pallets which is stable in a high substantially vertical array and can be returned to start point of use economically with regard to of volume, and space, and hence financially.

It will be understood that where the discharge means is a central orifice which does not have a conical valve, the pallets are nevertheless stackable and nestable as before, with the legs lying in line substantially vertically as shown in FIG. 4.

It will also be understood that any suitable valve other than a cone valve can be utilised.

The conventional wooden pallet has slatted upper and lower platforms separated by transverse members of sufficient height so that the forks of a lift truck can be inserted between the platforms in the direction of the length of the transverse members and then lifted to lift a load supported on the pallet. Fork lift trucks have forks at a standard distance apart and pallets are constructed for use with such forks.

The present invention is thus concerned with a pallet for a load which on certain occasions requires access through the centre of the pallet over an area extending across the region normally occupied by the standard forks of a lift truck. Thus there is provided a pallet comprising a plurality of feet ending at a first level for resting on the ground, a central aperture and means defining the end of the central aperture at a second level, above the first level, a pair of first tracks at said second level extending across the pallet symmetrically arranged about the centre and a pair of second tracks extending across the pallet symmetrically arranged about the centre at a greater spacing than the diameter of the central aperture. The pair of second tracks are preferably arranged at a third level, above the second level. The pallet is preferably provided with a pair of said first tracks extending across the pallet in one direction and a further pair of first tracks extending across the pallet in a second, transverse direction. Preferably the defining means comprises a cover for the central aperture, the outer surface of the cover being at said second level. At least some of said feet are preferably located outside the pair of second tracks.

In the embodiments, the pallet forms the base for a hopper for particulate material. The pallet is formed with a central aperture through which material from the hopper can be discharged and the lower end of the central aperture is closed by a cover. Although the pallet could be constructed in the conventional manner from planks and beams of wood, a preferable arrangement, as illustrated, is for the pallet to be moulded from plastics material. The pallet is moulded as described with a foot at each corner for resting on the ground, ground level being regarded as the first level of the pallet. The feet extend further from the corner towards the adjacent corner in a first direction than they do in a second, transverse, direction.

Between the feet, the underside of the pallet is generally at two different levels, including a third level for two tracks extending in the first direction of the pallet between the inner sides of the feet and the perimeter of the cover for the central aperture and a second level, intermediate the first and third levels, which includes the underside of the cover and areas extending from the central aperture in both the first and second directions, except for the areas at the third level. All tracks and areas are arranged symmetrically about the centre line of the pallet.

The diameter of the central aperture and its cover is greater than the spacing between the standard forks of a lift truck. When the standard forks approach the pallet from any direction, extending between the first and second levels, they can be raised to lift the pallet by engaging the cover on the underside of the central aperture and areas in front of and behind the cover on the underside of the pallet. These areas extend in all areas from the central aperture in a cross-shape, except for the first tracks which are at the higher third level. The third level tracks are bridged when the forks approach the pallet in the second direction, but the forks lie between these tracks when they approach the pallet in the first direction.

When the pallet is carried by the standard forks of a lift truck, the forks will obscure the central aperture whether or not the cover is in place. When it is desired to carry the pallet with the central aperture unobscured, special forks of a lift truck have to be used, with a wider spacing which engage the third level tracks and such forks can only approach the pallet in the first direction.

Another aspect is the use of an upper "bottle" or "bag" to create a transportable container for powders or liquids.

When a "bag" is used, which may be a flexible bag, e.g., of reinforced canvas, the bag may be band clamped, by a rigid, plastic or metal clamp, or by a plastic band, heat shrunk on. It is tapered slightly upwardly in to allow it to fold easily without damage into the hopper for return when empty. It may have a "sock" inlet for filling and tying off after, or have an open top band clamped to a moulded plastic top which may a variety of lids; (hinged, bandclamped; bayonet fixing). This operation allows automatic filling by means of a mechanical system to "grab" the rigid top at the inlet ring.

Figures 5, 6, 7:
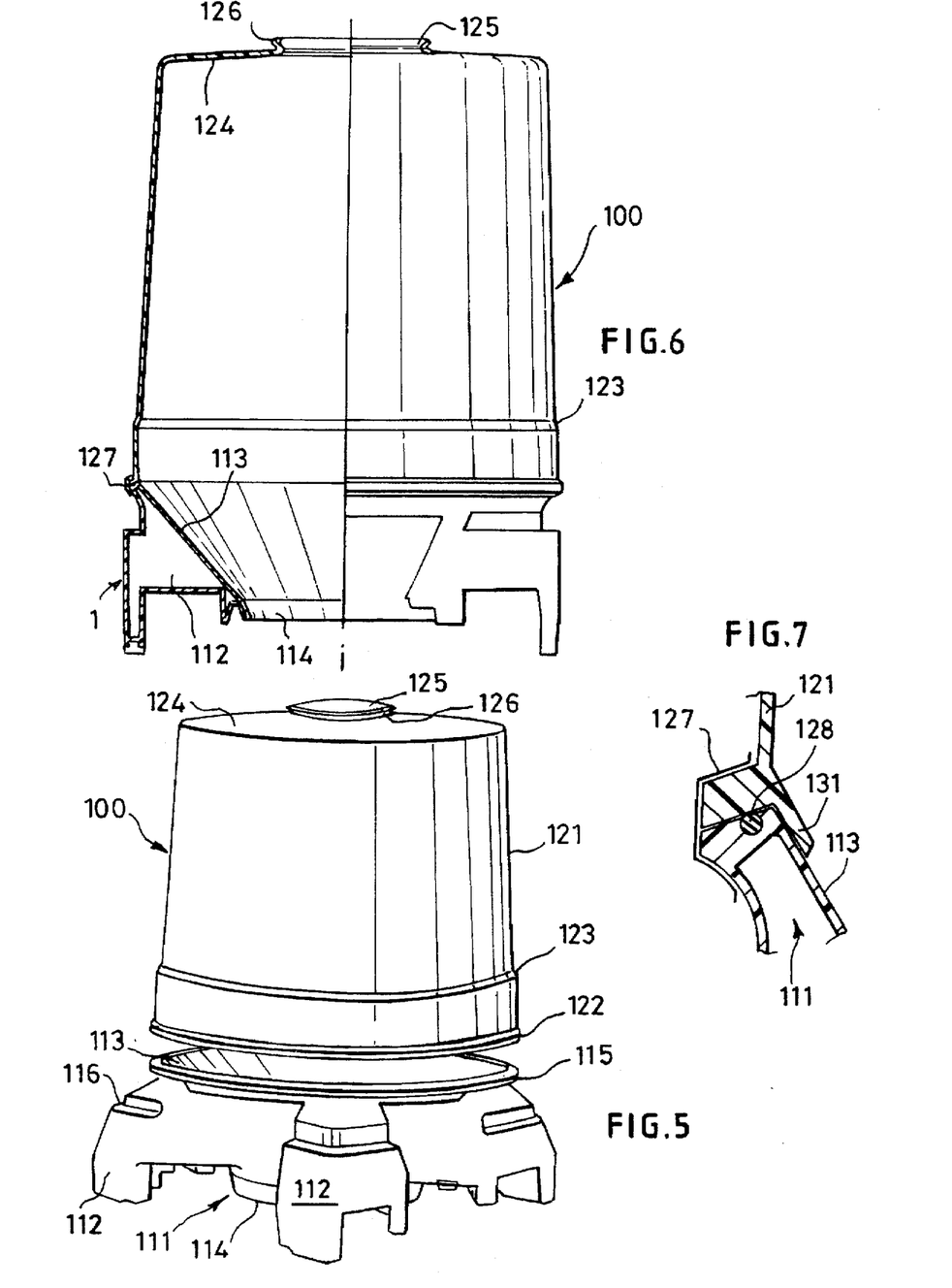
FIG. 5 is a perspective view of an embodiment of apparatus according to the invention, showing a base with a relatively rigid upper (in use) container shown slightly separated therefrom, for clarity.
FIG. 6 is a side elevation, partly in section, of the base with the container secured thereto.
FIG. 7 shows a modified detail of the apparatus of FIG. 2.

Referring to FIGS. 5 to 19, in which like parts are referred to by like reference numerals, and firstly referring to FIGS. 5 to 9, there is shown material handling apparatus 100 for handling flowable particulate material, comprising a base 111 (FIG. 5) which is of generally rectangular construction with feet 112 at each corner for supporting the base on the ground, a conical hopper 113 leading to a central outlet 114 supported above the ground on the feet 112. In FIG. 5, the hopper is truly conical, with a circular upper edge provided with an out-turned rim 115. In FIG. 5, the base 111 is moulded from plastics material.

Above the upper (in use) perimeter of the conical hopper, on support rim 115 there is mounted a container 121 having an upper portion comprising a generally frusto-conical body of relatively small angle of taper with a lower (in use) rim 122 which cooperates with the upper rim 115 of the base. There is an optional shoulder 123 a short distance from the rim 122 at its top region 124, the container 121 decreases in width rapidly to a central top opening 125 which is also provided with an outwardly directed lip 126. The container is rigid, suitably being made from plastic material.

The outwardly directed rim or lip 122 at the base of the container 121 and the outwardly directed rim or lip 115 at the top of the base portion can be sealed together by any suitable clamping means. They could, for example, be encircled by a band 127 of heat shrink material which is then heated to cause it to shrink around the two rims, thereby holding them together. One of the rims, preferably that of the base, may be provided with an 0-ring seal 128 on its face directed towards the rim of the upper portion in order to improve the seal between the two portions. The interior of the base and container adjacent the junction provided by the rims 115, 122 is preferably shaped so that there is no ledge on which material can rest which would contaminate either the container or the base if used for a different material. In particular, a spur 131 might be provided on the inside of the bottom rim of the upper container to extend across the plane of the junction between the two rims, to shield that junction from ingress of material, as shown in FIG. 7.

The lip 126 around the upper opening 125 to the container can be provided with a cover hereinafter described.

Figure 8:
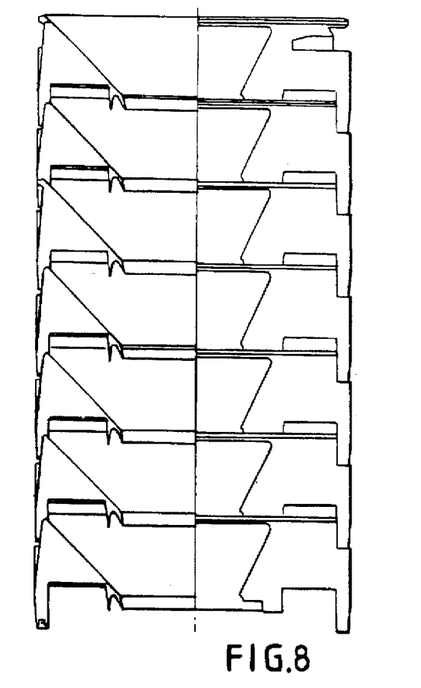
FIG. 8 is a side elevation of a plurality of stacked, nested, bases according to the invention.

The container is filled, once the hopper outlet opening 114 in the base has been sealed and the container properly clamped to the base portion 111, by filling through the upper opening 125 of the upper portion. The upper opening 125 is sealed and the apparatus is transported to the place of use, at which the bottom opening 114 from the base portion is opened to release material from the container 121. When the container is to be returned to its original loading station for refilling, the clamp 127 between the upper portion and the base portion is released and a plurality of base portions 111 are nested one within the other, as shown in FIG. 8. Similarly, a plurality of containers 121 are stacked one within the other and because the bodies of the containers are tapered, they can be nested one within the other, thus occupying about 24% of the volume which would be occupied by the same number of unstacked containers. A space saving of about 76% over normal unstackable containers is thus achieved. In order to re-use the apparatus, all that remains to be done is to clamp a container 121 to a base 111 and to ensure that the hopper outlet 114 is closed.

Figures 9, 11:
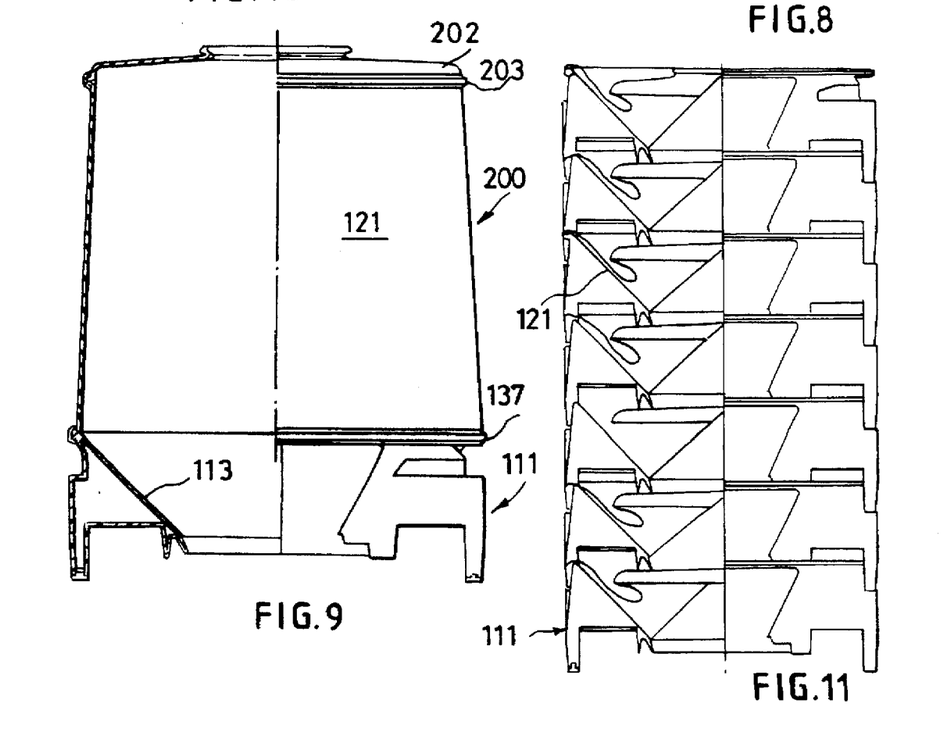
FIG. 9 is a similar view to FIG. 6, showing a separate embodiment of apparatus according to the invention.
FIG. 11 is a side elevation of a plurality of the apparatus of FIGS. 9 and 10, shown empty and nested.
Figure 10:
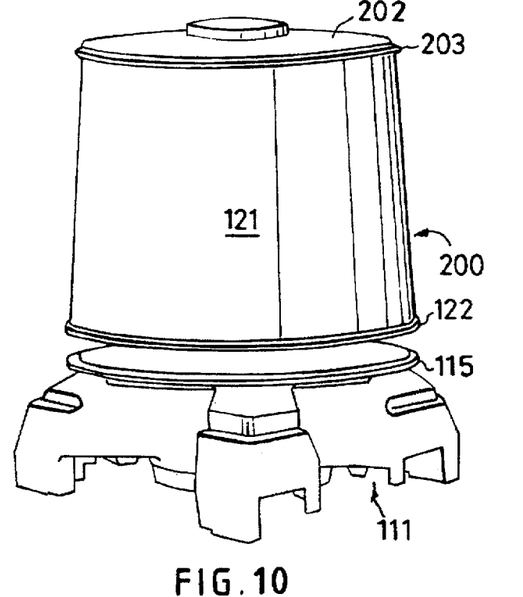
FIG. 10 is a similar view to FIG. 5, of the base of FIG. 9.

Referring now to FIGS. 9 to 11, the embodiment 200 shown there is similar to that of FIGS. 5 to 8, except that in this case the container 121, whilst being frusto-conical (tapering upwardly as viewed from the rim 122) is flexible, rather than relatively rigid as in the first embodiment. In this case, whilst the container and base are as before releasably engageable by suitable means 127, nevertheless when empty, and because of the taper, the container collapses neatly within the hopper 113 of the base 111, and is held in place there by gravity by the upper lid or cap 202. Thus the whole apparatus can be nested with an identical apparatus without the need to separate the container and base. This is extremely economical on space, taking about 12% of the space of a normal, empty, unnested apparatus, and thus a space saving of about 88% is achievable over normal containers. This therefore provides, as with the first embodiment, great economies of costs in transport and hence in handling the bulk particulate material in general.

The container 121 of the embodiment 200 is open at both ends, and is closable by the lid 202 which is securable to the main body of the container by a clamp system 203 similar to rims 115, 122 and clamps 127 whereby the body itself and the base are releasably engageable. The body being open at both ends means that the container can be filled automatically via the lid and, where applicable, by a lid using a containment seal, hence providing not only a rigid, automatic filling but also a high level of containment of the material being handled.

Figure 12:
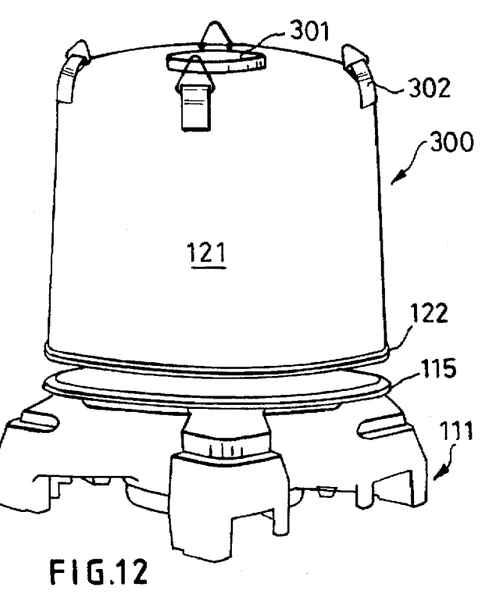
FIGS. 12 to 14 show views similar to FIGS. 9 to 11, but of a further embodiment of apparatus according to the invention.
Figure 13:
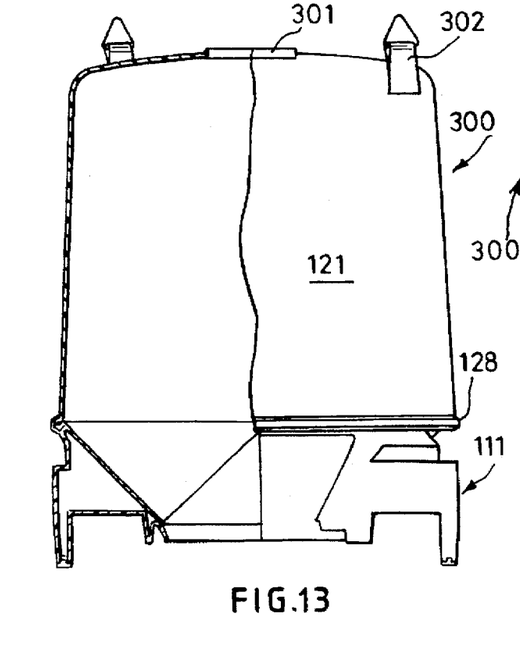
Figure 14:
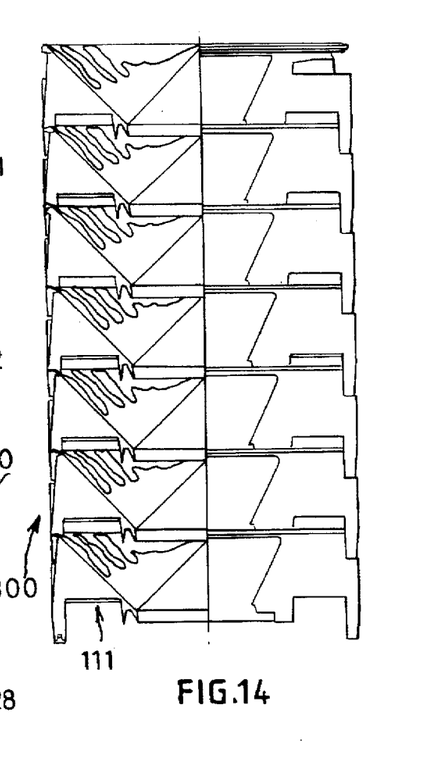

Referring now to FIGS. 12 to 14, again the embodiment 300 of material handling apparatus shown is similar to that of the previous embodiments, the container 121 in this case comprising a bag which is closed at the top (as viewed) by a central lid 301 and is movable by hooks 302. The container 121 is a collapsible bag which is circular in cross-section, and has only one seam, thereby allowing the bag to collapse on itself and inwardly into the base (FIG. 14) so that the whole apparatus 300 can be stacked and nested with another similar apparatus without disengaging the container 121 from the base 111. This again takes up about 12% of the space of unnestable apparatus, and therefore saves about 88% of the space available for transport when the apparatus is returned empty from a discharge station to a point of fill.

It will be understood that in all the embodiments, the bases 111 are nestable and stackable as the feet 112, which are of L-shape nest with recesses or steps 116 which are located in upwardly (as viewed) tapered surfaces of the base so that one is within the other, the hopper 113 being received one within the other, and the angle of the taper of the tapered surface being such that a substantially vertical stacked and nested array is formed.

Figure 15:
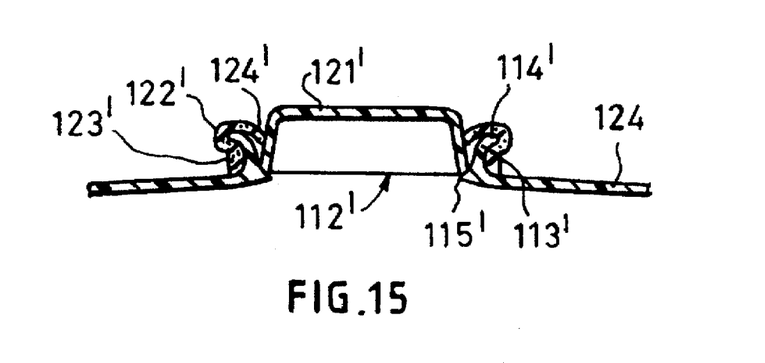
FIG. 15 is a cross-section through an inlet on the container showing a plug in position and a seal around the inlet aperture.

In all embodiments of containers with a central filling orifice, the upper wall 124 has a central aperture 112' surrounded by a low wall 113' whose upper portion is turned outwards to form an outwardly directed lip 114'. The junction of the low wall and the upper wall of the container is provided with a flange directed inwards of the aperture to form an inwardly directed lip 115' (FIG. 15).

On the lip 115' is mounted an inverted dish-shaped plug 121' whose side walls are frusto-conical and whose mouth fits onto the upper edge of the inwardly directed lip. The height of the plug 121' is slightly greater than that of the low wall 113'.

Sealing material 122' is wrapped around the outwardly directed lip of the low wall 113' to form a relatively thick region 123' of seal on the exterior of the wall and a relatively thin region 124' of seal on top of the wall extending across to engage the plug.

Figure 16:
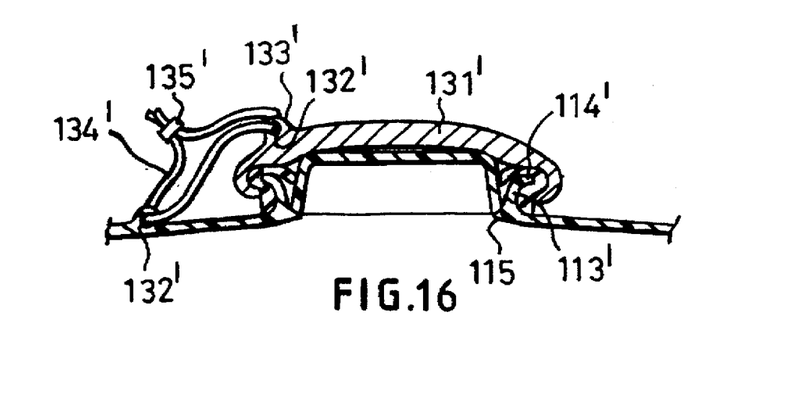
FIG. 16 is a corresponding section showing a cap in position over the inlet with a security tie in position.

As can be seen in FIG. 16, a cap 131' is placed over the low wall 113' and rotated through a small angle to hold it in position, the outwardly directed lip 114' and the inwardly directed lip 115' of the cap being shaped to form a bayonet type joint between the two so that a small turn of the cap 131' relative to the container holds the cap tightly in position on the inlet. The cap 131' is provided with an eye 132' as is the outer wall of the container 133 adjacent the inlet and a tie 134' is secured between the two eyes, its free ends being secured together by means of a lead seal 135' which can be impressed by a security cede only available to authorized persons.

The plug 121' serves to contain the material within the container when it is positioned on the inwardly directed lip 114' and it is retained in that position by the outer cap 131'. During transit therefore, the material within the container cannot escape through the inlet, even if the container is allowed to fall over. Furthermore, if an unauthorized person opens the inlet in order to introduce contaminating material or steal the present contents, he must break the sealed tie and cannot replace the seal so that the absence of a proper seal should provide adequate evidence of tampering with the contents of the container.

Figure 17:
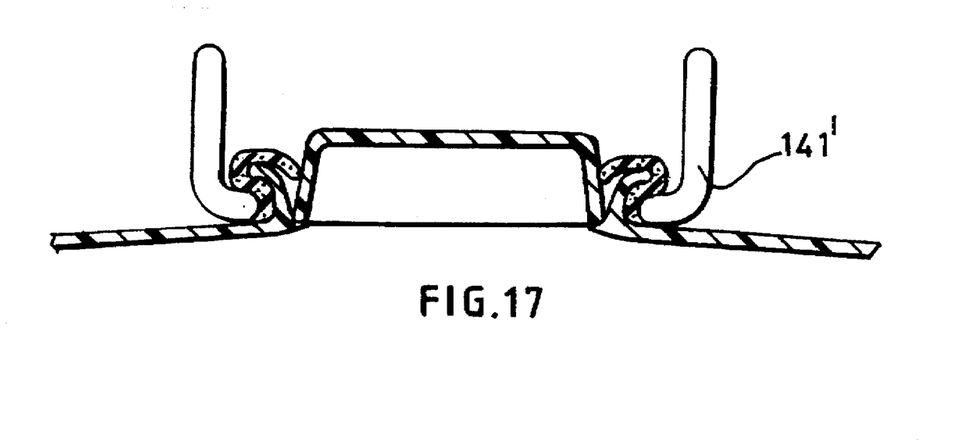
FIG. 17 shows the arrangement of FIG. 5 with a transporting claw engaging the outwardly directed lip of the inlet.

It will be seen in FIG. 17 that the shape of the low wall 113' around the inlet provides a useful receptacle for gripping fingers 141' of a transporting apparatus, which can be dram into the re-entrant formed by the outer surface of the low wall to grip the container and thereby lift it to a new location without disturbing the plug 1the plug 121' or the sealing material 122'. The cap 131' will, however, have to be removed for this process.

Figure 18:
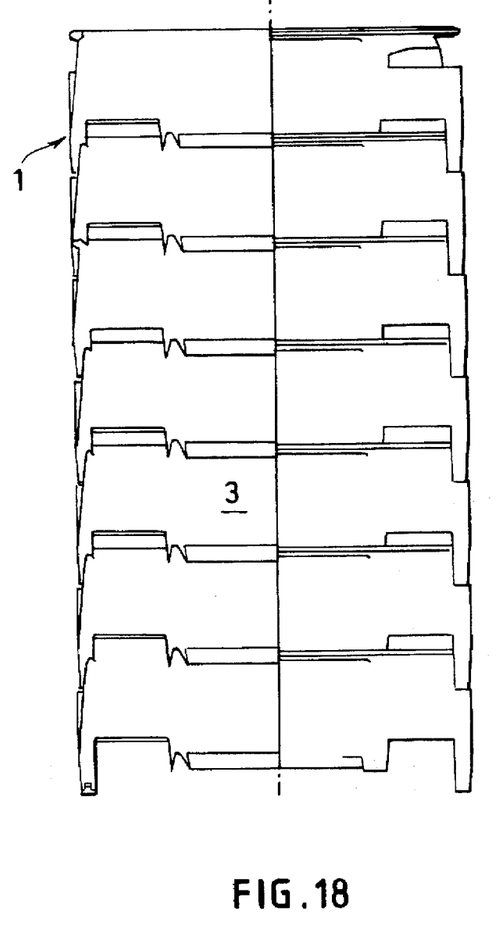
FIG. 18 shows a stack of pallets nested of the kind shown in FIG. 1.
Figure 19:
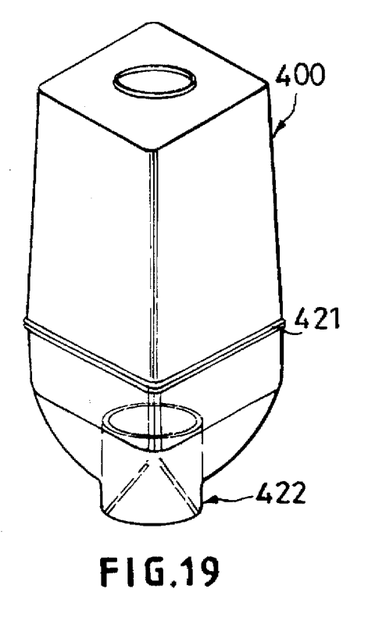
FIG. 19 shows a schematic perspective view of a container of apparatus embodying the invention.

Referring now to FIGS. 18 and 19, the base 1 shown is identical to that of FIG. 1 and is made in one piece from plastic material, having a surface in the form of a ring for supporting a container 400, a means of the pallet arranged in use to provide for discharge of material from a container of flowable (particulate) material, and means for stacking and nesting with another similar pallet.

There is a clamp ring 2 as in FIG. 1 which receives a similar ring 421 of the container 400 which rings 2, 421 can be clamped together by suitable means to provide a unitary arrangement so that the pallet 1, and the container 400 can be filled and transported in one location, and discharged at a discharge station. The pallet 1 thus includes the discharge means in the form of a central orifice which receives an outlet 422 of the container 400 which can be operated with total containment, at a discharge station. The outlet 422 includes an integral cone valve.

The container 400 is square (or polygonal) in top plan, and has a square to round configuration at the conical outlet 422, which is received as described in the orifice 3, in which position the ring 2 and flange 421 are superposed and in contact and are clamped together for filling and transport.

The empty container and the pallets are separated and returned separately, the pallets being nested together (FIG. 18) saving 30% on the volume normally occupied by such apparatus.

In all embodiments, the invention provides a modular system in that a base can be used with different embodiments of containers, for example as shown in the Figures. Also, the containers may be rigid and made in any desired shape in plan, for example square or round, and are suitable for transport of materials by sea.

I claim:

1. A material handling apparatus comprising:
   a pallet including
   a body having a surface for supporting a container;
   a portion for discharging material from the container;
   a portion for stacking and nesting with another similar apparatus; and
   a base having channel means capable of receiving one size of forks of fork-lift machines and channel means capable of receiving another size of forks of fork-lift machines but incapable of receiving said one size of forks.

2. An apparatus as defined in claim 1, wherein the pallet is moulded in one piece from plastic.

3. An apparatus as defined in claim 1, wherein said channel means for receiving one size of forks of fork-lift machines extends transversely to said channel means for receiving another size of forks of fork-lift machines.

4. An apparatus as defined in claim 1, wherein the portion for discharging material comprises a substantially conical part of the apparatus.

5. An apparatus as defined in claim 4, wherein the substantially conical part comprises a valve.

6. An apparatus as defined in claim 1, wherein the body has an outer surface which is inclined towards a central axis of the pallet.

7. An apparatus as defined in claim 6, wherein said outer surface comprises, a rebate, which receives a complementary shaped foot of a substantially identical pallet for nesting and stacking.

8. An apparatus as defined in claim 1, further comprising a container, and wherein the pallet and container have releasably interengageable portions for connecting the pallet and container together.

9. An apparatus as defined in claim 8, wherein the pallet is adapted to receive the container whilst permitting discharge of the contents of the container.

10. An apparatus as defined in claim 8, wherein the container comprises a flexible bag.

11. An apparatus as defined in claim 8, wherein the container comprises a rigid plastic container.

* * * * *